United States Patent [19]

Lenton

[11] 4,377,126

[45] Mar. 22, 1983

[54] HARD FACING MACHINE

[75] Inventor: Kenneth G. Lenton, Lethbridge, Canada

[73] Assignee: Versatile Cornat Corporation, Vancouver, Canada

[21] Appl. No.: 247,505

[22] Filed: Mar. 25, 1981

[51] Int. Cl.³ .............................................. B05C 11/00
[52] U.S. Cl. ..................................... 118/47; 118/236; 118/500; 118/300
[58] Field of Search ............... 427/225, 319, 300, 209, 427/427, 190, 191, 328, 9; 118/47, 236, 500, DIG. 9; 219/76.1, 76.11, 76.12, 76.13, 76.14, 76.15, 76.16, 77

[56] References Cited

U.S. PATENT DOCUMENTS 1,679,435 8/1928 McFetridge ........................ 427/328
4,258,651 3/1981 Knudtson ..................... 118/DIG. 9

Primary Examiner—Sam Silverberg
Attorney, Agent, or Firm—Wenderoth, Lind & Ponack

[57] ABSTRACT

A method and apparatus used to deposit a carbide layer of metal material on blade material. The apparatus comprises a feed means that continuously feeds blade material to a metal deposition means which continuously deposits the metal layer on the blade material. A drive means is adapted to drive the blade material through the metal deposition area.

12 Claims, 3 Drawing Figures

HARD FACING MACHINE

INTRODUCTION

This invention relates to a metal depositing apparatus and, in particular, to a metal depositing apparatus where metal is being deposited on blade material used for a blade cultivator.

BACKGROUND OF THE INVENTION

Blade cultivators are used in the agricultural industry for "minimum tillage" farming, a type of farming particularly useful where soil drifting is a problem. Minimum tillage farming attempts, as far as possible, to leave an undisturbed stubble cover on the top of the ground to prevent soil drifting and soil erosion.

A blade cultivator acts beneath the ground surface to undercut the stubble residue. In so working, the blade is subject to wear and to extend the life of the blade and reduce wear, a layer of chromium carbide as deposited on the blade material. Present machines used to deposit this chromium carbide layer suffer from disadvantages.

Present machines utilize a "carriage assembly" in which the blade material is supported and conveyed through the metal depositing device. Size limitations dictate that only two pieces of blade material be mounted simultaneously in the carriage. Following the deposition of metal on these two pieces, they are manually removed from the carriage, the carriage is returned to its initial position and two more pieces are then mounted in the carriage to be similarly conveyed through the metal depositing device. The method is inefficient.

A further problem with recent machines is that in order to properly apply the metal layer to the blade, a "preheating" of the blade is necessary on both sides before metal deposition in order to bring the blade temperature to the appropriate level or "sweating" temperature for the metal to be deposited and to keep the blade material straight in the machine. Time is necessary for this preheating to be accomplished and, necessarily, the carriage cannot move the blade material into the metal deposition area until the appropriate temperature is reached. This, similarly, is inefficient.

A further problem associated with present machines involves their basic design. A moving carriage requires a means to drive it, to stop it, to return it and to initiate the drive again. All require separate design elements which can wear unnecessarily.

SUMMARY OF THE INVENTION

In accordance with one aspect of the invention, there is disclosed a hard facing apparatus for depositing a metal layer on blade material comprising feed means to continuously feed said blade material to a metal deposition area, drive means to move said blade material through said metal deposition area and tension means to drive said blade material while in said feed means, said feed means comprising in feed support rollers mounted to a feed table to guide and support said blade material, said feed table having one end pivotable about a substantially vertical axis adjacent said metal deposition area, said metal deposition area continuously depositing said metal layer on said blade material.

BRIEF DESCRIPTION OF THE SEVERAL VIEWS OF THE DRAWINGS

The invention will now be described, by way of example only, with the use of the accompanying drawings in which.

DETAILED DESCRIPTION

Figure 1:
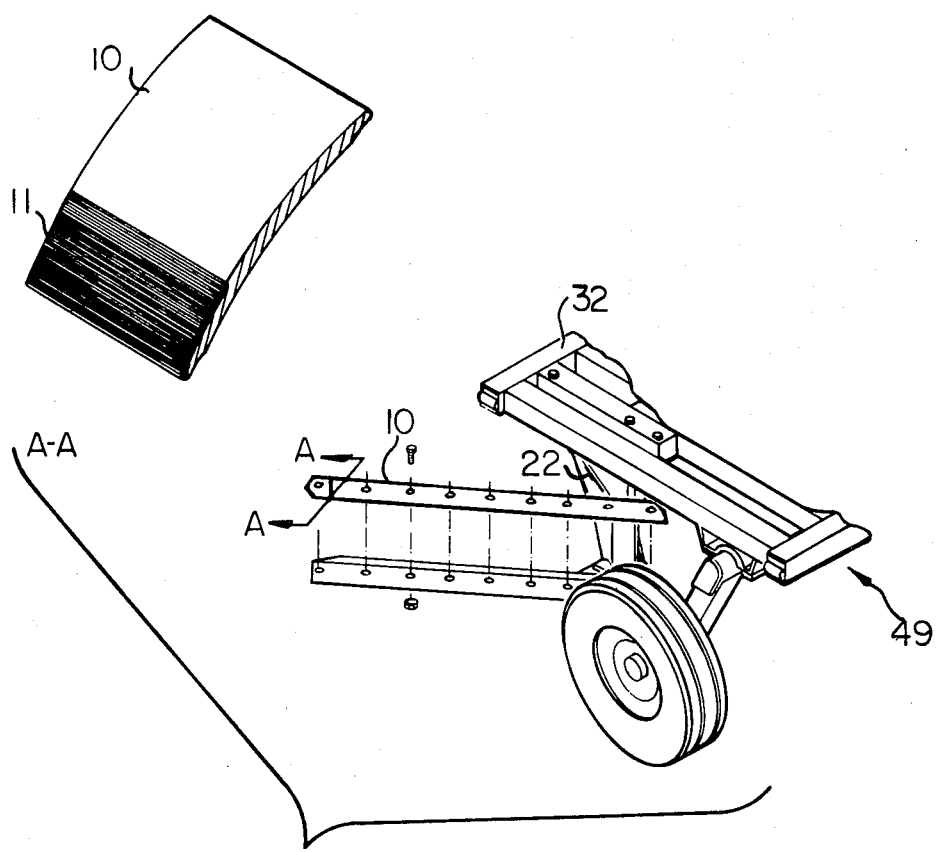
FIG. 1 shows a view of the blade attached to a cultivator with its deposited metal layer shown in an enlarged view entitled A—A.

Referring now to the drawings, a sectional view of a blade 10 used for minimum tillage farming applications is shown in FIG. 1. The blade 10 is adapted to be attached to a shank 22 which, in turn, is attached to the frame 32 of an implement generally denoted 49. The implement 49 is attached to a tractor (not shown) and used in the field for severing roots of nutrient robbing plants while maintaining a stubble cover to prevent soil erosion from wind and the like.

A metal layer of chromium carbide 11 has been deposited in the recess of blade 10. The metal layer 11 is considerably harder than the material of the rest of the blade 10 and, therefore, since it is located in the forward portion of the blade 10, it retards wear on the blade 10.

Figure 2:
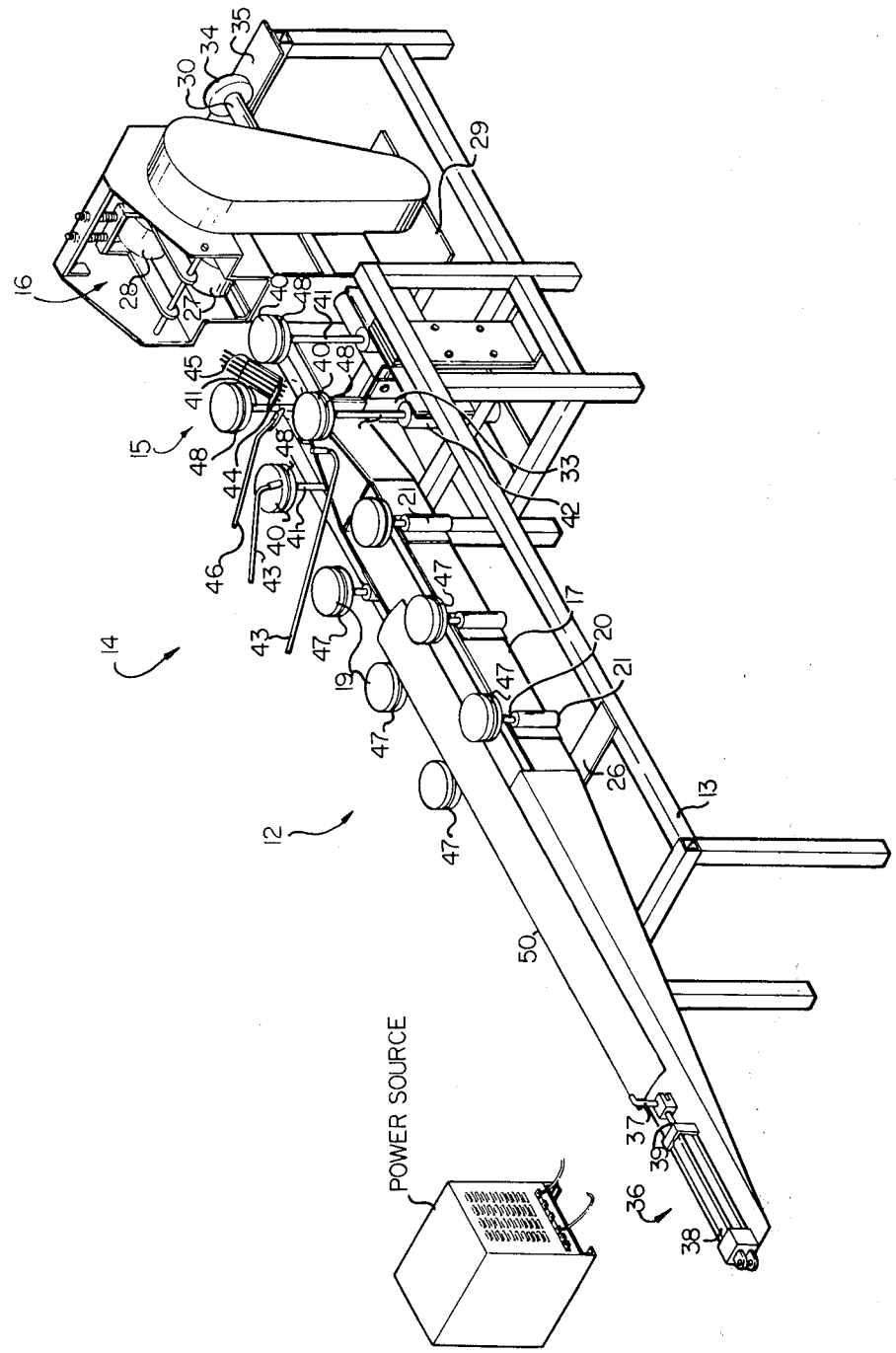
FIG. 2 is an isometric view of a machine in an assembled condition according to the present invention which is used to deposit the metal layer.

A machine for depositing the chromium carbide 11 is shown generally at 12 in FIG. 2. The machine 12 comprises a main frame 13, a feed means area 14, a metal deposition area 15 and a drive means area 16.

The feed means area 14 comprises a feed table 17 mounted for rotation about centre shaft 18. A series of feed rollers 19 are mounted on respective shafts 20 and these shafts 20 are, in turn, mounted within guides 21 which are connected to the feed table 17. Feed rollers 19 are vertically adjustable to fit the outside of the blade material 50. Grooves 47 exist within feed rollers 19 to hold the blade material 50.

Feed table 17 has a bushing 23 mounted around centre shaft 18 adapted to allow rotation of the feed table 17 about the centre shaft 18. At the end of the feed table 17 opposed to the end on which bushing 23 is mounted, a shaft 24 is attached and support roller 25 is mounted for rotation thereon. A wear plate 26 is mounted to the main frame 13 and support roller 25 rotates while moving on wear plate 26.

Figure 3:
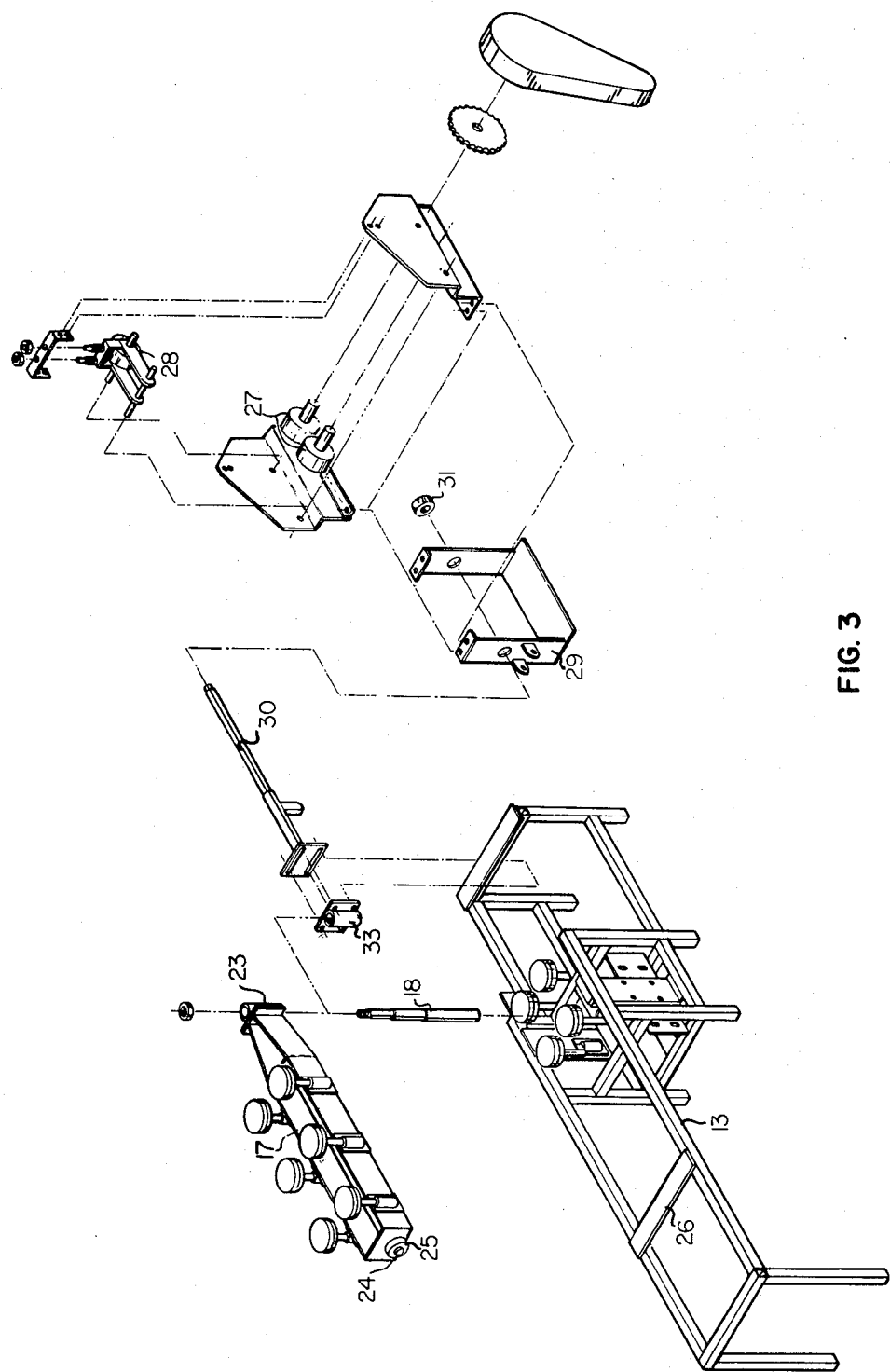
FIG. 3 is an exploded isometric view of some portions of the assembled machine of FIG. 2.

The drive means area 16 is mounted forwardly of the metal deposition area 15 (i.e., rightwardly in FIGS. 2 and 3). The drive means area 16 comprises drive rollers 27 and an idler roller 28. The drive rollers 27 and idler roller 28 are mounted on a tilt frame 29 which, in turn, is mounted for rotation on drive pivot shaft 30 by bearings 31. Drive pivot shaft 30 is mounted within drive pivot bushing 33, which is itself rotatable about centre shaft 18. At the end of drive pivot shaft 30 opposed to the end mounted within drive pivot bushing 33, a roller 34 surrounds drive pivot shaft 30 and, like support roller 25, is allowed to rotate on wear plate 35 connected to main frame 13.

An air operated feed device is generally shown at 36 in FIG. 2 and comprises a pusher dog 37 connected to the piston rod 39 of air operated feed cylinder 38. This device acts to feed and maintain force on each individual piece of blade material 50 until the piece proceeds into the drive means area 16.

The metal deposition area 15 comprises four guide rollers 40, each roller 40 having a groove 48 and being mounted on a respective shaft 41 which is connected to a respective bracket 42. Brackets 42 are adjustably mounted on main frame 13.

The metal deposition area 15 also comprises natural gas preheaters 43 mounted above and below the blade material 50. In addition, there is a wire feed contact bracket 44 which guides chromium carbide wire 45. An acetylene torch 46 acts to help melt the wire 45 in the metal deposition area 15. The wire feed contact bracket 44, in fact, holds a plurality of wires 45 and they reciprocate with the contact bracket 44 in a direction transverse to the longitudinal direction of movement of the blade material 50. This transverse movement, however, together with the action of the acetylene torch 46, preheaters 43 and wire feed contact bracket 44 form no part of the present invention and will not, therefore, be described further.

OPERATION

In operation, a piece of blade material 50 is mounted within the grooves 47 of feed rollers 19 by adjusting the vertical distance of each feed roller 19 in order to adjust the "tilt" of the blade material. A correct tilt is needed so that the molten carbide layer 11 deposited on the blade material 50 will not run off when it is deposited. The pusher dog 37 contacts the end of the blade material 50 and the grooves 48 of the guide rollers 19 guide the edges of blade material 50 as the blade material 50 is pushed into the recess between drive roller 27 and idler rollers 28. Drive rollers 27 are then in contact with the blade material 50 and upon being actuated, begin to "pull" the blade material 50 through the metal deposition area 15.

The natural gas preheaters 43 are ignited and heat the top and bottom of the blade material 50 to the appropriate sweating temperature. The carbide wire 45 in the metal deposition area 15 is melted by a combination of the preheating of the blade material 50, the action of the acetylene torch 46 and the contact between the blade material 50 and the carbide wires 45. A "pool" of carbide material is thus deposited in the recess of the blade material 50 and, as the blade material 50 leaves the metal deposition area 15, the molten carbide hardens into the chromium carbide layer 11.

After the end of the blade material 50 leaves the last feed roller 19, the pusher dog 37 is removed, a new piece of blade material 50 is mounted in the grooves 47 of the feed rollers 19 and the pusher dog 37 is reattached. The new piece of blade material 50 is moved until it contacts the previous piece of blade material in a butt joint meeting. Thereafter, the process continues as before.

It will be appreciated that the first piece of blade material in the process will be discarded since the metal deposition did not occur over its entire length. Thereafter, however, the process may be continuous without the need being present for an interruption in metal deposition.

Clearly, there may be suggested many changes in the apparatus and method without departing from the scope of the invention which should, therefore, be limited only by the scope of the accompanying claims.

The embodiments of the invention of which an exclusive property or privilege is claimed or defined as follows:

1. A hard facing apparatus for depositing a metal layer on blade material comprising feed means to continuously feed said blade material to a metal deposition area, drive means to move said blade material through said metal deposition area and tension means to drive said blade material while in said feed means, said feed means comprising infeed support rollers mounted to a feed table to guide and support said blade material, said feed table having one end pivotable about a substantially vertical axis adjacent said metal deposition area, and metal depositing means at said metal deposition area continuously depositing said metal layer on said blade material.

2. An apparatus as in claim 1 wherein said drive means comprises at least one drive roller and at least one idler roller to move said blade material through said metal deposition area.

3. An apparatus as in claim 2 wherein said drive means further comprises a tilt frame to support said blade material and being rotatable about a substantially horizontal axis adjacent said metal deposition area.

4. An apparatus as in claim 3 wherein said in feed support rollers have grooves, said grooves holding and guiding said blade material.

5. An apparatus as in claim 4 wherein said feed table includes a support roller at the end opposed to said one end, said support roller supporting said opposed end as said feed table pivots about said substantially vertical axis.

6. An apparatus as in claim 5 wherein said feed table and said tilt frame are supported by a main frame.

7. An apparatus as in claim 6 wherein said in feed support rollers are adjustable in directions sustantially transverse and substantially perpendicular to said blade material.

8. An apparatus as in claim 3 wherein said substantially horizontal axis is a support shaft, said support shaft having a support roller at one end and being pivotal about said substantially vertical axis at the opposite end.

9. An apparatus as in claim 8 wherein said support shaft is connected to a fitting, said fitting being pivotal about said substantially vertical axis.

10. A hard facing apparatus for depositing a metal layer on blade material, said apparatus comprising a main frame, guide means to guide said blade material and connected to said main frame, metal deposition means to deposit metal on said blade material and conveying means connected to said main frame to convey said blade material through said hard facing apparatus, said guide means including a feed table pivotable about a substantially vertical axis at a first end and in feed support rollers adjustably mounted on opposite sides of said feed table, said rollers having peripheral grooves adapted to contact and guide said blade material, said feed table further including a support roller in contact with said main frame adjacent said end opposed to said first end to support said feed table and allow pivotal movement about said first end.

11. A hard facing apparatus as in claim 10 wherein said conveying means comprises a drive roller adjustably contacting said blade material, said drive roller being adjustably mounted within a tilt frame, said tilt frame being mounted for pivotal movement about a substantially horizontal support shaft, said support shaft being mounted for rotation about said substantially vertical axis at one end and being connected to a support roller adapted to contact and move pivotably relative to said main frame at the opposite end.

12. A hard facing machine as in claim 11 wherein said conveying means further comprises an idler roller adjustably contacting said blade material.

* * * * *